(12) United States Patent
Lee

(10) Patent No.: US 8,896,691 B2
(45) Date of Patent: Nov. 25, 2014

(54) SURVEILLANCE DEVICE AND METHOD

(75) Inventor: Hsun-Hsien Lee, Taoyuan (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 973 days.

(21) Appl. No.: 13/007,046

(22) Filed: Jan. 14, 2011

(65) Prior Publication Data

US 2012/0019657 A1 Jan. 26, 2012

(30) Foreign Application Priority Data

Jul. 26, 2010 (TW) ................ 99124536 A

(51) Int. Cl.
*H04N 7/18* (2006.01)
*G06K 9/00* (2006.01)
*G08B 13/00* (2006.01)

(52) U.S. Cl.
CPC ............ *H04N 7/181* (2013.01); *G06K 9/00771* (2013.01); *G06K 9/00* (2013.01); *G08B 13/00* (2013.01)
USPC ............................ 348/143; 348/142; 348/144

(58) Field of Classification Search
CPC ......... H04N 7/181; H04N 7/183; H04N 7/18; H04N 7/188; G08B 13/19656
USPC .......................................................... 348/143
See application file for complete search history.

(56) References Cited

U.S. PATENT DOCUMENTS

| | | | |
|---|---|---|---|
| 6,285,399 B1 * | 9/2001 | Tao | 348/312 |
| 7,295,109 B2 | 11/2007 | Kobayashi | |
| 7,839,926 B1 * | 11/2010 | Metzger et al. | 375/240.01 |
| 2002/0031086 A1 * | 3/2002 | Welin | 370/229 |
| 2003/0156188 A1 * | 8/2003 | Abrams, Jr. | 348/51 |
| 2004/0008253 A1 * | 1/2004 | Monroe | 348/143 |
| 2004/0136388 A1 * | 7/2004 | Schaff | 370/401 |
| 2004/0169733 A1 | 9/2004 | Ishizaka et al. | |
| 2004/0247205 A1 * | 12/2004 | Nagaya et al. | 382/305 |
| 2005/0094615 A1 * | 5/2005 | Kim et al. | 370/349 |
| 2005/0174473 A1 * | 8/2005 | Morgan et al. | 348/370 |
| 2005/0265321 A1 * | 12/2005 | Rappaport et al. | 370/352 |
| 2006/0007871 A1 * | 1/2006 | Welin | 370/252 |
| 2006/0013257 A1 * | 1/2006 | Vayanos | 370/473 |
| 2006/0200845 A1 * | 9/2006 | Foster et al. | 725/81 |
| 2006/0253552 A1 * | 11/2006 | Ohi et al. | 709/219 |
| 2006/0279634 A1 * | 12/2006 | Onno et al. | 348/207.1 |
| 2007/0024706 A1 * | 2/2007 | Brannon et al. | 348/142 |
| 2007/0035627 A1 * | 2/2007 | Cleary et al. | 348/159 |
| 2007/0039030 A1 * | 2/2007 | Romanowich et al. | 725/105 |
| 2007/0051872 A1 * | 3/2007 | Goldberg et al. | 250/208.1 |
| 2007/0064109 A1 * | 3/2007 | Renkis | 348/159 |
| 2007/0076095 A1 * | 4/2007 | Tomaszewski | 348/155 |
| 2007/0090972 A1 * | 4/2007 | Monroe et al. | 340/945 |
| 2007/0112971 A1 * | 5/2007 | Noff et al. | 709/231 |
| 2007/0130599 A1 * | 6/2007 | Monroe | 725/105 |
| 2008/0008125 A1 * | 1/2008 | Pham et al. | 370/329 |
| 2008/0211906 A1 * | 9/2008 | Lovric | 348/143 |
| 2009/0167948 A1 * | 7/2009 | Berman et al. | 348/575 |

(Continued)

*Primary Examiner* — Andy Rao
*Assistant Examiner* — Shan Elahi
(74) *Attorney, Agent, or Firm* — WPAT, PC; Justin King

(57) ABSTRACT

A surveillance device is disclosed, comprising an interface and a controller coupled with the interface. The interface is coupled with a communication device to receive an image data transmitted from an image capturing device through the communication device. The controller generates a control signal according to the image data and transmits the control signal to the image capturing device for adjusting one or more transmission parameters and/or image capturing parameters of the image capturing device.

20 Claims, 2 Drawing Sheets

(56) References Cited

U.S. PATENT DOCUMENTS

2009/0189981 A1* 7/2009 Siann et al. .................. 348/143
2009/0288011 A1* 11/2009 Piran et al. .................. 715/720
2010/0097470 A1* 4/2010 Yoshida et al. ............... 348/159
2010/0295782 A1* 11/2010 Binder .......................... 345/158
2011/0096168 A1* 4/2011 Siann et al. .................. 348/158
2012/0224032 A1* 9/2012 Takiguchi ...................... 348/47

* cited by examiner

SURVEILLANCE DEVICE AND METHOD

CROSS-REFERENCE TO RELATED APPLICATIONS

This application claims the benefit of priority to Taiwanese Patent Application No. 099124536, filed on Jul. 26, 2010, the entirety of which is incorporated herein by reference for all purposes.

BACKGROUND

The present disclosure generally relates to a surveillance device, and more particularly, to a surveillance device capable of adjusting transmission parameters and/or image capturing parameters.

As the technology evolves, conventional image capturing devices and storage devices are gradually replaced by digitized image capturing devices and surveillance systems. The wired or wireless communication between the image capturing devices and the surveillance servers can simplify the hardware installation and expand the surveillance range. On the other hand, as the number of image capturing devices and the accompanied recorded data increase, the management of the surveillance systems becomes more complicated.

In certain circumstances, the wired or wireless communication devices might interfere with one another. Moreover, the deficient bandwidth between the image capturing devices and the surveillance servers also influences the data transmission. These uncertainties should be avoided in the surveillance systems. The surveillance systems and methods capable of more reliable data communication are needed to solve the above issues.

SUMMARY

In view of the foregoing, it is appreciated that a substantial need exists for reliable surveillance systems and methods to mitigate the problems mentioned above.

An example embodiment of a surveillance device comprises an interface for coupling with a communication device to receive an image data transmitted from an image capturing device through the communication device; and a controller coupled with the interface for generating a control signal according to the image data and for transmitting the control signal to the image capturing device for adjusting one or more transmission parameters and/or image capturing parameters of the image capturing device.

An example embodiment of a surveillance method comprises receiving an image data from an image capturing device; generating a control signal according to the image data; and transmitting the control signal to the image capturing device for adjusting one or more transmission parameters and/or image capturing parameters of the image capturing device.

It is to be understood that both the foregoing general description and the following detailed description are exemplary and explanatory only and are not restrictive of the invention, as claimed.

DETAILED DESCRIPTION

Reference will be made in detail to exemplary embodiments of the disclosure, which are illustrated in the accompanying drawings. The same reference numbers may be used throughout the drawings to refer to the same or like parts or operations.

Certain terms are used throughout the description and following claims to refer to particular components. As one skilled in the art will appreciate, a component may be referred to as different names. This disclosure does not intend to distinguish between components that differ in name but not in function. In the following description and in the claims, the terms "include" and "comprise" are used in an open-ended fashion, and thus should be interpreted to mean "include, but not limited to . . . " The phrase "coupled with" is intended to compass any direct or indirect connection. Accordingly, if this disclosure mentioned that a first device is coupled with a second device, it means that the first device may be directly or indirectly connected to the second device through an electrical connection, wireless communications, optical communications, or other signal connections with/without other intermediate devices or connection means.

Figure 1:
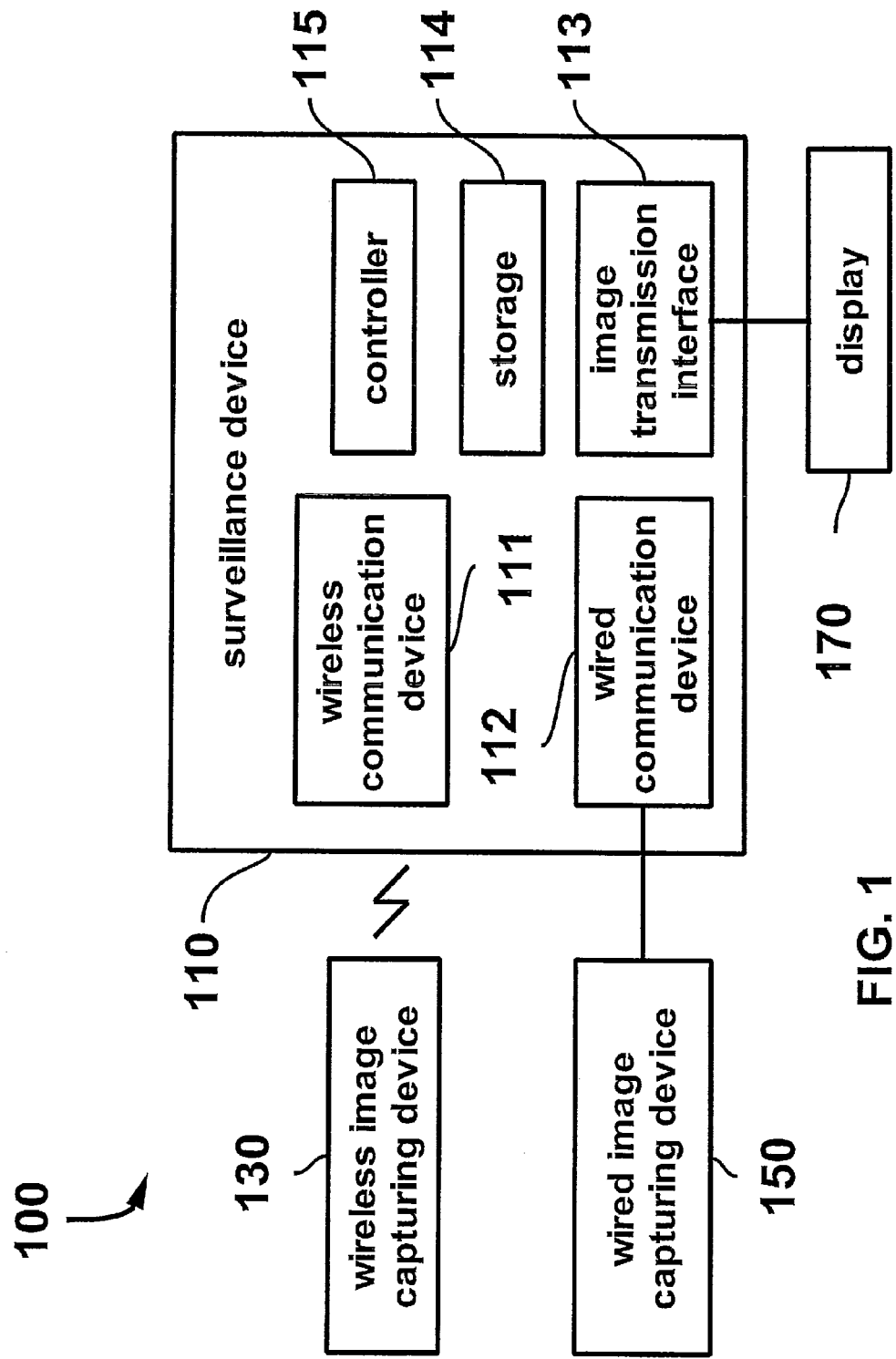
FIG. 1 shows a simplified block diagram of an example surveillance system.

FIG. 1 shows a simplified block diagram of an example surveillance system 100. The surveillance system 100 comprises a surveillance device 110, a wireless image capturing device 130, a wired image capturing device 150, and a display 170.

The surveillance device 110 comprises a wireless communication device 111, a wired communication device 112, an image transmission interface 113, a storage 114, and a controller 115. The wireless communication device 111 is coupled with the wireless image capturing device 130 by wireless personal network, wireless local network, Bluetooth, worldwide interoperability for microwave access, cellular network, or other suitable wireless communication technology. The wireless communication device 111 comprises a transmitter and a receiver (both not shown in FIG. 1) for transceiving (i.e., transmitting and receiving) data with the wireless image capturing device 130. The wired communication device 112 is coupled with the wired image capturing device 150 by local network, metropolitan network, power line communication, universal serial bus (USB), personal computer interface (PCI), PCI Express, other buses or protocols, or other suitable wired communication technology. The wired communication device 112 comprises a transmitter and a receiver (both not shown in FIG. 1) for transceiving data with the wired image capturing device 150.

In FIG. 1, only one wireless communication device 111 and one wired communication device 112 are illustratively shown. The surveillance device 110 can also comprise only one wireless communication device, only one wired communication device, multiple communication devices (wired and/or wireless) utilizing the same communication technology, or multiple communication devices (wired and/or wireless) utilizing multiple communication technology for coupling to the image capturing devices. These wired and wireless communication devices may be built in the surveillance device 110 and/or externally coupled with the surveillance device 110 through suitable interfaces, e.g., the above-mentioned interfaces.

The image transmission interface 113 is coupled with the display 170 by PCI, PCI-E, USB, D-SUB, AGP, DVI, HDMI, or suitable wired/wireless interfaces for data transmission. The storage 114 may be hard drives, optical drives, flash memories, or suitable physical/chemical storage devices. The storage 114 may be built in or externally coupled with the surveillance device 110 by a suitable transmission interface. The controller 115 may be realized with one or more processors, computers, specific purpose discrete circuits or integrated circuits, other suitable hardware, or a collaboration of software and hardware.

The wireless image capturing device 130 captures the images of the objects or the space of interest. The captured image data are transmitted to the wireless communication device 111 of the surveillance device 110 by wireless communications. There are several adjustable parameters in the wireless image capturing device 130, e.g., the wireless signal strength, the wireless transmission rate, the wireless transmission frequency, the wireless signal transmission priority, or the data transmission priority.

The wired image capturing device 150 captures the images of the objects or the space of interest. The captured image data are transmitted to the wired communication device 112 of the surveillance device 110 by wired communications. There are several adjustable parameters in the wired image capturing device 150, e.g., the trans-mission rate, the data transmission priority.

In the wireless image capturing device 130 and the wired image capturing device 150, the image capturing rate, the image capturing resolution, the image color depth, and/or the image encoding format are also adjustable. The wireless image capturing device 130 and the wired image capturing device 150 may be cameras, image/video recorders, or other types of image capturing devices.

The display 170 receives the data from the image transmission interface 113 of the surveillance device 110 for displaying the captured image from the image capturing devices, warning messages, and/or other information.

The receiver of the wireless communication device 111 receives the image data transmitted from the wireless image capturing device 130. The controller 115 of the surveillance device 110 calculates transmission parameters and/or image capturing parameters according to the received image data, and/or receives the transmission parameters and/or image capturing parameters along with the received image data (e.g., the parameters generated by the image capturing device 130). In some embodiments, the transmission parameters and the image capturing parameters associated with the image data of the wireless image capturing device 130 can be the wireless signal strength, the wireless transmission rate, the transmission latency, the delay time, the bit errors, the packet errors, the frame errors, the image decoding errors, the image capturing rate, the image capturing resolution, the image color depth, and/or the image encoding format. The controller 115 can also generate one or more reliability parameters according to the image data, the transmission parameters, and/or the image capturing parameters. In one embodiment, the controller 115 directly uses the transmission parameters and/or image capturing parameters as the reliability parameters. In another embodiment, the controller 115 compares the errors, the transmission latency, or other parameters with one or more predetermined threshold values to generate one or more reliability parameters.

In another embodiment, the control 115 compares the image data with a predetermined pattern, e.g., a blank image frame, to generate a reliability parameter. For example, when the received image data are determined to be the blank image frame for a certain period, it could mean that the wireless communications between the wireless image capturing device 130 and the surveillance device 110 are interfered or that the wireless image capturing device 130 is blocked by unexpected objects. Accordingly, the controller 115 generates corresponding reliability parameters to indicate these situations.

The controller 115 may also detect possible wireless communication problems and/or image capturing problems according to the transmission parameters, the image capturing parameters, and/or the reliability parameters. Then, the controller 115 generates corresponding control signals for adjusting the transmission parameters and/or the image capturing parameters. The control signals are transmitted through the transmitter of the wireless communication device 111, other transmission interfaces, and/or other communication devices to the wireless image capturing device 130. For example, when the packet errors exceed a predetermined threshold value, the controller 115 generates a low reliability parameter and a corresponding control signal. The control signal is transmitted to the wireless image capturing device 130 through the transmitter of the wireless communication device 111 for lowering the wireless transmission rate, switching the wireless transmission frequency, enhancing the transmission priority, and/or adjusting the image capturing parameters. One or more transmission parameters and/or image capturing parameters may be adjusted to ensure the stability of the image data transmission. Moreover, the controller 115 may generate a rest signal for resetting or shutting down the wireless image capturing device 130. The reset signal is transmitted through the transmitter of the wireless communication device 111, other transmission interfaces, and/or other communication devices to the wireless image capturing device 130.

The controller 115 may transmit the image data, the associated parameters (e.g., the transmission parameters, the image capturing parameters, the reliability parameters) of the image data, the comparison result of the image data and a predetermined pattern, and relevant information to the display 170 through the image transmission interface 113. For example, the image data and the associated parameters may be synchronously displayed on the display 170 so that the system manager can monitor the image data and the associated parameters. In other embodiments, the image data, the associated parameters of the image data, the comparison results of the image data and a predetermined pattern, and relevant information of multiple image capturing devices are simultaneously displayed on the display 170 so that the system manager can monitor the image data and the associated parameters from multiple image capturing devices at the same time.

The controller 115 may also generate warning messages according to the image data, the associated parameters of the image data, the comparison results of the image data and a predetermined pattern, and relevant information for notifying the system manager the status of the surveillance system, e.g., the wireless image capturing device 130 is blocked by unexpected objects or cannot stably transmit the image data. The warning messages are transmitted to the system manager's message receiving device through suitable transmission interfaces or communication devices. In some embodiments, the warning messages are transmitted and displayed on the display 170. The warning messages may also be transmitted to the system manager's message receiving device by short message, email, voice, and so on through the transmitter of the wireless communication device 111, the transmitter of the wired transmission device 112, other transmission interfaces, and/or other wired/wireless communication devices. These warning messages enable the system manager to figure out the possible cause of the malfunction more directly and easily. As a result, the burden of examining each of the possible malfunctioned devices for the system manager can be relieved and the system maintenance can be greatly simplified.

The image data of the wireless image capturing device 130, the transmission parameters, the image capturing parameters, the reliability parameters, the control signals, and/or the warning messages may be saved in the storage 114 for future management and other purposes.

The receiver of the wireless communication device 112 receives the image data transmitted from the wired image capturing device 150. The controller 115 of the surveillance device 110 calculates transmission parameters and/or image capturing parameters according to the received image data, and/or receives the parameters along with the received image data. For example, the transmission parameters and the image capturing parameters associated with the image data of the wired image capturing device 150 may be the transmission rate, the transmission latency, the delay time, the bit errors, the packet errors, the frame errors, the image decoding errors, the image capturing rate, the image capturing resolution, the image color depth, and/or the image encoding format. The controller 115 may also generate one or more reliability parameters according to the image data, the transmission parameters, and/or image capturing parameters. For example, the controller 115 directly uses the transmission parameters and/or image capturing parameters as the reliability parameters. In another embodiment, the controller 115 compares the errors, the transmission latency, or other parameters with one or more predetermined threshold values to generate one or more reliability parameters. In another embodiment, the control 115 compares the image data with a predetermined pattern to generate a reliability parameter.

The controller 115 may detect possible wired communication problems and/or image capturing problems according to the transmission parameters, the image capturing parameters, and/or the reliability parameters. Then, the controller 115 generates corresponding control signals for adjusting the transmission parameters and/or the image capturing parameters. The control signals are transmitted through the transmitter of the wired communication device 112, other transmission interfaces, and/or other communication devices to the wired image capturing device 150. One or more transmission parameters and/or image capturing parameters may be adjusted according to the control signals to ensure the stability of the image data transmission. Moreover, the controller 115 may generate a rest signal for resetting or shutting down the wired image capturing device 150. The reset signal is transmitted through the transmitter of the wired communication device 112, other transmission interfaces, and/or other communication devices to the wired image capturing device 150.

The controller 115 may transmit the image data, the associated parameters of the image data, the comparison result of the image data and a predetermined pattern, and relevant information to the display 170 through the image transmission interface 113. The image data and the associated parameters, therefore, can be synchronously displayed on the display 170 so that the system manager can monitor the image data and the associated parameters.

The controller 115 may also generate warning messages according to the image data, the associated parameters of the image data, the comparison results of the image data and a predetermined pattern, and relevant information for notifying the system manager the status of the surveillance system. The warning messages are transmitted to the system manager's message receiving device, e.g., displays, mobile phones, computers, caution lights, or other notification means through suitable transmission interfaces or communication devices. Similarly, these warning messages enable the system manager to figure out the possible cause of the malfunction more directly and the burden of examining each of the possible malfunctioned devices can be relieved.

The image data of the wireless image capturing device 130, the transmission parameters, the image capturing parameters, the reliability parameters, the control signals, and/or the warning messages may be saved in the storage 114 for future management and other purposes. Moreover, to achieve a better system performance, the system manager may also adjust the system setting, e.g., the topology of the surveillance system, the transmission parameters of the image capturing devices, or the image capturing parameters of the image capturing devices according to the image data, the associated parameters, and/or warning messages.

Figure 2:
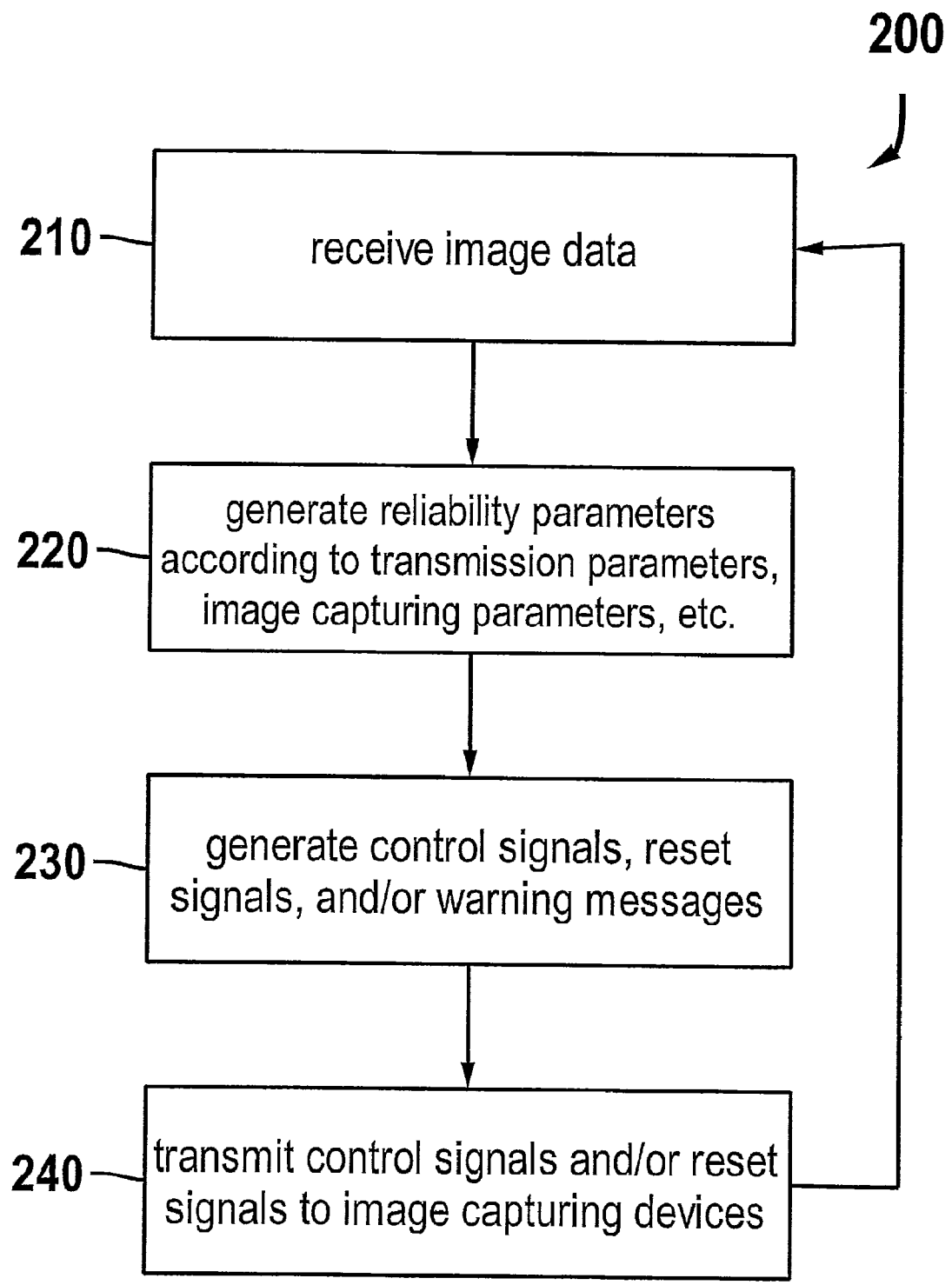
FIG. 2 shows a flowchart of an example surveillance method, all arranged in accordance with at least some embodiments of the present disclosure described herein.

FIG. 2 shows a flowchart of an example surveillance method. In an operation 210, the image data transmitted form wired or wireless image capturing devices are received. In an operation 220, one or more reliability parameters are generated according to the transmission parameters, the image capturing parameters, the comparison result of the image data and a predetermined pattern, or other information of the received image data. In an operation 230, one or more control signals are generated according to the reliability parameter(s), the transmission parameters, the image capturing parameters, the comparison result of the image data and a predetermined pattern, or other parameters of the received image data. Warning messages may also be generated and transmitted to the message receiving device of the manager. Moreover, a reset signal can also be generated. In operation 240, the control signals or the reset signals are transmitted to the image capturing devices for adjusting the transmission parameter(s) and/or image capturing parameter(s), or resetting or shutting down the image capturing devices.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A surveillance device, comprising:
    an interface for coupling with a communication device to receive an image data transmitted from an image capturing device through the communication device; and
    a controller coupled with the interface for generating a control signal according to the image data and for transmitting the control signal to the image capturing device for adjusting one or more transmission parameters or image capturing parameters of the image capturing device,
    wherein the controller detects wireless communication problems or image capturing problems according to the transmission parameter or a reliability parameter.

2. The surveillance device of claim 1, wherein the interface receives the image data through the communication device by wireless communications, and the controller generates the control signal according to at least one of a wireless signal strength, a wireless transmission rate, packet errors, bit errors, frame errors, image decoding errors, a transmission latency, a delay time, a comparison result of the image data and a predetermined data pattern, an image capturing rate, an image capturing resolution, an image color depth, and an image encoding format.

3. The surveillance device of claim 2, wherein one of the transmission parameters is selected from a group consisting of a wireless transmission strength, a wireless transmission rate, a wireless transmission frequency, a wireless signal transmission priority, and a data transmission priority.

4. The surveillance device of claim 1, wherein the interface receives the image data through the communication device by wired communications, and the controller generates the control signal according to at least one of a transmission rate, packet errors, bit errors, frame errors, image decoding errors, a transmission latency, a delay time, a comparison result of the image data and a predetermined data pattern, an image capturing rate, an image capturing resolution, an image color depth, and an image encoding format.

5. The surveillance device of claim 4, wherein one of the transmission parameters is selected from a group consisting of a transmission rate and a data transmission priority.

6. The surveillance device of claim 1, wherein one of the image capturing parameter is selected from a group consisting of an image capturing rate, an image capturing resolution, an image color depth, and an image encoding format.

7. The surveillance device of claim 1, wherein the controller is further utilized for generating a reset signal and transmitting the reset signal to the image capturing device for resetting or shutting down the image capturing device.

8. The surveillance device of claim 1, wherein the controller is further utilized for generating a warning message and transmitting the warning message to a message receiving device.

9. The surveillance device of claim 1, wherein the controller is further utilized for generating a reliability parameter according to at least one of a wireless signal strength, a wireless transmission rate, packet errors, bit errors, frame errors, image decoding errors, a transmission latency, a delay time, a comparison result of the image data and a predetermined data pattern, an image capturing rate, an image capturing resolution, an image color depth, and an image encoding format.

10. The surveillance device of claim 9, further comprising:
a storage device for storing the image data and the reliability parameter.

11. A surveillance method, comprising:
receiving an image data from an image capturing device;
detecting wireless communication problems or image capturing problems according to a transmission parameter or a reliability parameter;
generating a control signal according to the image data; and
transmitting the control signal to the image capturing device for adjusting one or more transmission parameters or image capturing parameters of the image capturing device.

12. The surveillance method of claim 11, wherein the step of receiving the image data comprises:
receiving the image data from the image capturing device by wireless communications;
wherein the step of generating the control signal comprises:
generating the control signal according to at least one of a wireless signal strength, a wireless transmission rate, packet errors, bit errors, frame errors, image decoding errors, a transmission latency, a delay time, a comparison result of the image data and a predetermined data pattern, an image capturing rate, an image capturing resolution, an image color depth, and an image encoding format.

13. The surveillance method of claim 12, wherein one of the transmission parameters is selected from a group consisting of a wireless transmission strength, a wireless transmission rate, a wireless transmission frequency, a wireless signal transmission priority, and a data transmission priority.

14. The surveillance method of claim 11, wherein the step of receiving the image data comprises:
receiving the image data from the image capturing device by wired communications;
wherein the step of generating the control signal comprises:
generating the control signal according to at least one of a transmission rate, packet errors, bit errors, frame errors, image decoding errors, a transmission latency, a delay time, a comparison result of the image data and a predetermined data pattern, an image capturing rate, an image capturing resolution, an image color depth, and an image encoding format.

15. The surveillance method of claim 14, wherein one of the transmission parameters is selected from a group consisting of a transmission rate and a data transmission priority.

16. The surveillance method of claim 11, wherein one of the image capturing parameter is selected from a group consisting of an image capturing rate, an image capturing resolution, an image color depth, and an image encoding format.

17. The surveillance method of claim 11, further comprising:
generating a reset signal; and
transmitting the reset signal to the image capturing device for resetting or shutting down the image capturing device.

18. The surveillance method of claim 11, further comprising:
generating a warning message; and
transmitting the warning message to a message receiving device.

19. The surveillance method of claim 11, further comprising:
generating a reliability parameter according to at least one of a wireless signal strength, a wireless transmission rate, packet errors, bit errors, frame errors, image decoding errors, a transmission latency, a delay time, a comparison result of the image data and a predetermined data pattern, an image capturing rate, an image capturing resolution, an image color depth, and an image encoding format.

20. The surveillance method of claim 19, further comprising:
storing the image data and the reliability parameter to a storage device.

* * * * *